United States Patent
Yoo

(10) Patent No.: US 8,199,307 B2
(45) Date of Patent: Jun. 12, 2012

(54) LIQUID CRYSTAL DISPLAY

(75) Inventor: Jong-Kun Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 534 days.

(21) Appl. No.: 12/467,691

(22) Filed: May 18, 2009

(65) Prior Publication Data

US 2010/0073618 A1   Mar. 25, 2010

(30) Foreign Application Priority Data

Sep. 25, 2008 (KR) .................. 10-2008-0094016

(51) Int. Cl.
*G02F 1/1345* (2006.01)
(52) U.S. Cl. .................. 349/149; 349/152; 345/55
(58) Field of Classification Search .................. None
See application file for complete search history.

(56) References Cited

U.S. PATENT DOCUMENTS

2007/0205976 A1* 9/2007 Takatori et al. ............... 345/100
2011/0012887 A1* 1/2011 Lee et al. ...................... 345/212

* cited by examiner

*Primary Examiner* — Hemang Sanghavi
(74) *Attorney, Agent, or Firm* — Cantor Colburn LLP

(57) ABSTRACT

A liquid crystal display includes: a liquid crystal panel assembly including pixels, gate lines, data lines and a first gate driver; and a driving chip disposed on the liquid crystal panel assembly. A shape of the liquid crystal panel assembly is rectangular and the liquid crystal panel assembly includes a long edge and short edge. The gate lines extend in a same direction as the short edge, and the data lines extend in a same direction as the long edge. The pixels are disposed in pixel rows and are connected to the gate lines and the data lines. The first gate driver is disposed on a peripheral area of the long edge, and the driving chip is connected to the data lines.

18 Claims, 5 Drawing Sheets

LIQUID CRYSTAL DISPLAY

This application claims priority to Korean Patent Application No. 10-2008-0094016, filed on Sep. 25, 2008, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display. More particularly, the present invention relates to a liquid crystal display including a delta type pixel type.

(b) Description of the Related Art

A liquid crystal display ("LCD") is a widely used type of flat panel display. In general, an LCD includes two panels, each provided with field-generating electrodes, and a liquid crystal ("LC") layer interposed between the two panels. The LCD displays images by applying voltages to the field-generating electrodes, to generate an electric field in the LC layer. The electric field determines orientations of LC molecules in the LC layer to adjust a polarization of incident light.

Typically, a plurality of pixel electrodes and thin film transistors are disposed in a substantially matrix pattern on a first display panel of the two display panels (hereinafter referred to as "a thin film transistor array panel"), and red, green, and blue color filters are disposed on a second display panel of the two display panels. A common electrode covers an entire surface of the second display panel (hereinafter referred to as "a common electrode panel").

The liquid crystal display is typically classified as either a stripe type or a delta type, based on a pixel structure of the liquid crystal display. Furthermore, a delta type liquid crystal display is generally used to display a motion picture and/or in a stop image data display. Thus, the delta type liquid crystal display is often used in equipment such as a digital camera and a digital camcorder, for example.

A decrease in size, measured along a longitudinal direction of a liquid crystal display, is desired to improve the liquid crystal display.

BRIEF SUMMARY OF THE INVENTION

Exemplary embodiments of present invention provide advantages which include, but are not limited to, a substantially reduce width of an upper part and/or a lower part of a liquid crystal display. In an exemplary embodiment, the liquid crystal display is a delta type liquid crystal display.

A liquid crystal display according to an exemplary embodiment of the present invention includes: a liquid crystal panel assembly including pixels, gate lines, data lines and a first gate driver; and a driving chip disposed on the liquid crystal panel assembly. A shape of the liquid crystal panel assembly is rectangular and the liquid crystal panel assembly includes first long edge and a short edge. The data lines extend in a first direction substantially parallel to the long edge, and the gate lines extend in a second direction substantially parallel to the first long edge. The pixels are disposed in pixels rows and are connected to the gate lines and the data lines. The first gate driver is disposed on a peripheral area of the first long edge, and the driving chip is connected to the data lines.

A shape of the pixels may be rectangular and each of the pixels may include a long edge and a short edge. The long edge of the pixels may be substantially parallel to the gate lines, and the short edge of the pixels may be substantially parallel to the data lines.

The first gate driver may be integrated into the liquid crystal panel assembly.

The pixel rows may include: a first pixel row in which respective pixels therein are arranged in a first sequence comprising a red pixel, a green pixel and a blue pixel; and a second pixel row in which respective pixels therein are arranged in a second sequence comprising a green pixel, a blue pixel and a red pixel. The first sequence of the first pixel row and the second sequence of the second pixel row are alternately repeated in subsequent pixel rows of the pixel rows.

The gate lines may include curves proximate to the pixels and may be disposed between adjacent pixels.

The gate lines may include a first gate line, a second gate line, and a third gate line. The first gate line is connected to the red pixel of the first pixel row and the green pixel of the second pixel row, the second gate line is connected to the green pixel of the first pixel row and the blue pixel of the second pixel row, and the third gate line is connected to the blue pixel of the first pixel row and the red pixel of the second pixel row.

The driving chip may include a signal controller and a latch. The signal controller may convert an input image signal into an output image signal and may generate a gate control signal and a data control signal. The latch may apply the output image signal and the data control signal to the data line.

The signal converter may convert the input image signal into the output image signal by exchanging a number corresponding to a given gate line and a number corresponding to a given data line based on a position coordinate of data represented by the number corresponding to the given gate line and the number corresponding to the given data line.

The liquid crystal panel assembly may further include a second long edge, opposite to and substantially parallel to the first long edge, and a second gate driver disposed proximate to the second long edge.

The second gate driver may be integrated into the liquid crystal panel assembly.

Odd-numbered gate lines of the gate lines may be connected to the first gate driver, and even-numbered gate lines of the gate lines may be connected to the second gate driver.

When a resolution of a display area of the liquid crystal panel assembly is A×B, a number of data lines extending in the first direction is less than a number of gate lines extending in the second direction by a factor of B/3A.

Thus, according to exemplary embodiments of the present invention, a gate driver is integrated an upper portion of a liquid crystal panel assembly, and a data driver is mounted directly on a right portion of the liquid crystal panel assembly as one integrated circuit ("IC") chip such that a length, along a longitudinal direction of the liquid crystal panel assembly, is substantially reduced and/or effectively minimized.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
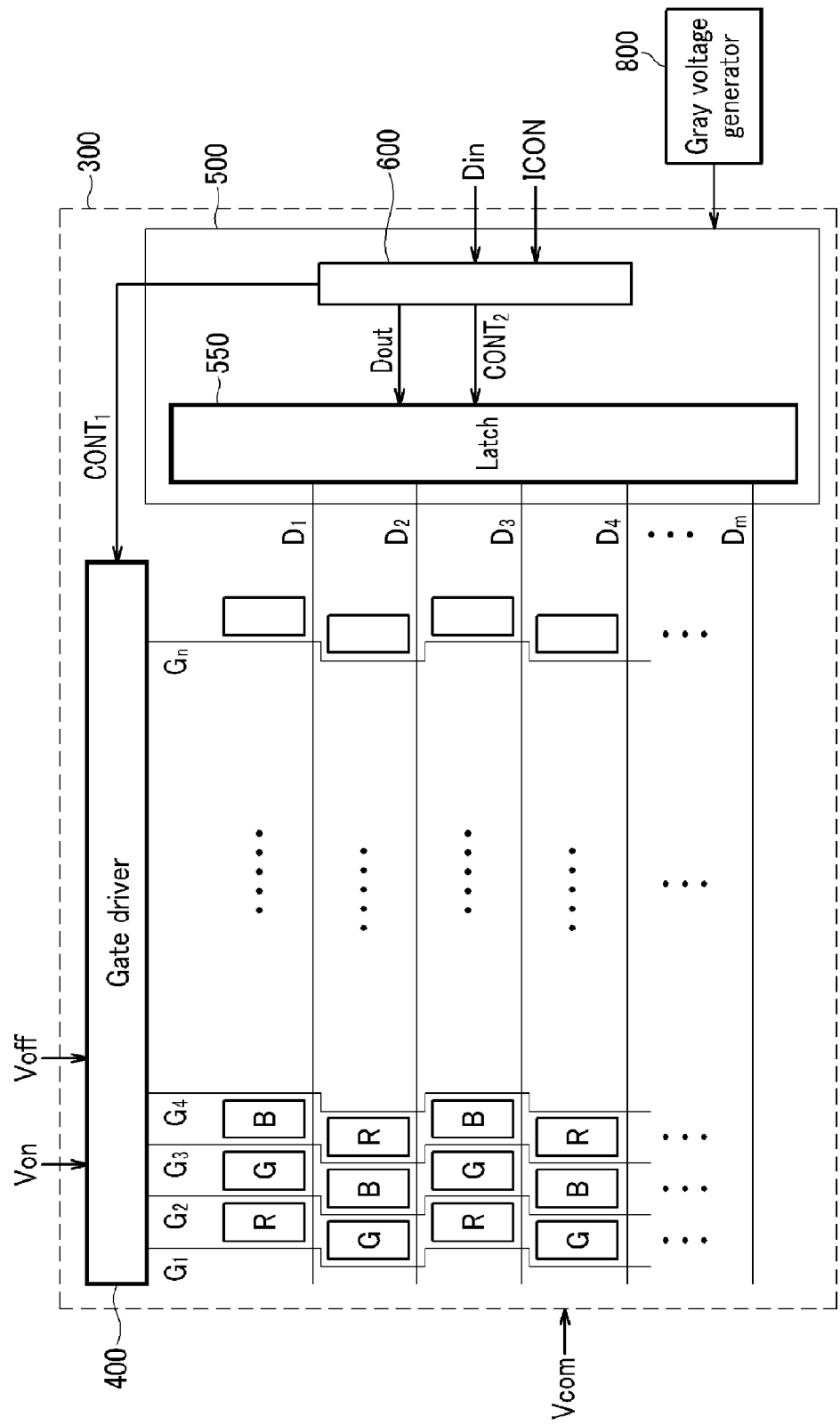
FIG. 1 is a block diagram of an exemplary embodiment of a liquid crystal display according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, a liquid crystal display according to an exemplary embodiment of the present invention will be described in further detail with reference to FIGS. 1 and 2.

Figure 2:
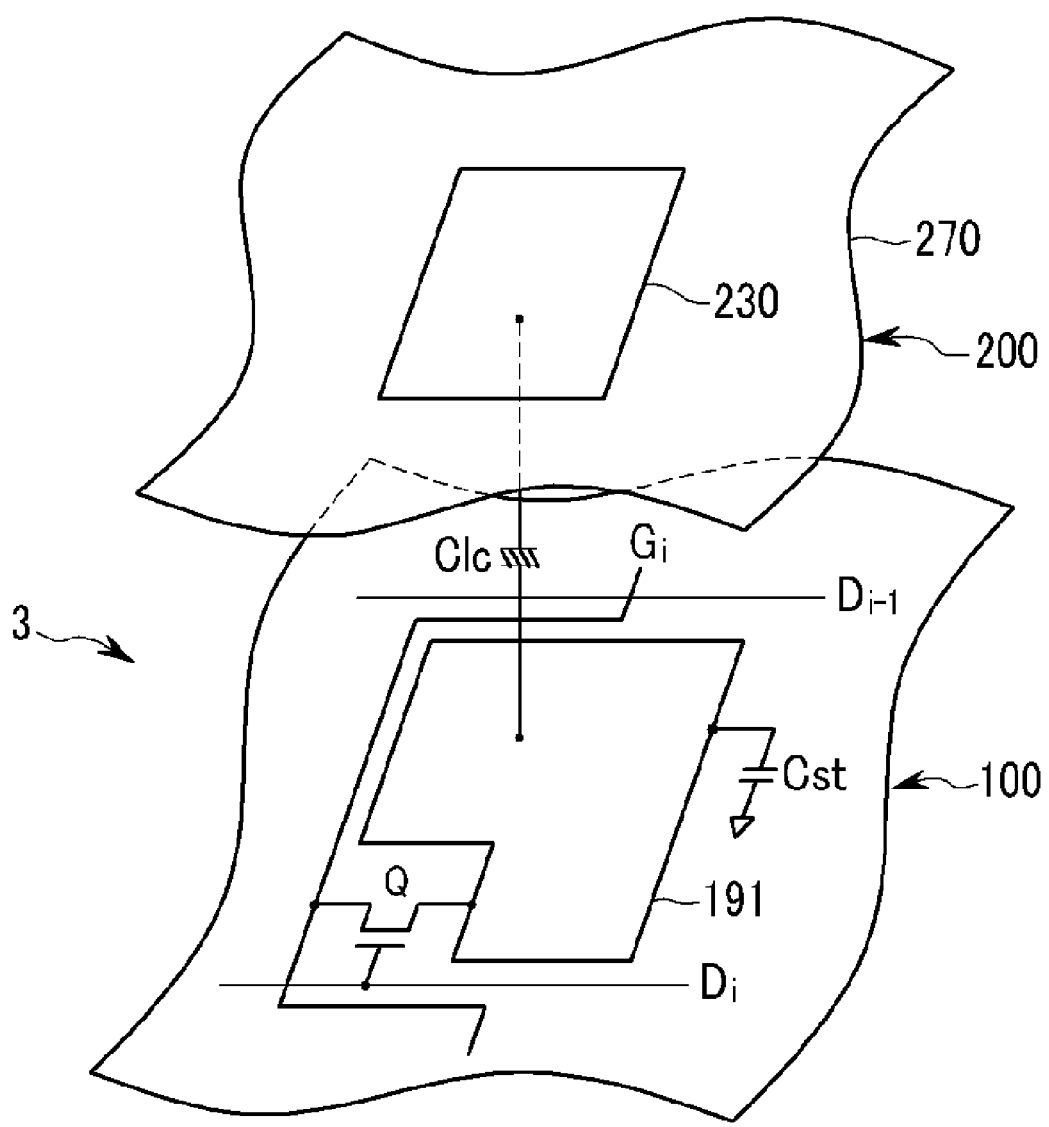
FIG. 2 is an equivalent circuit diagram of an exemplary embodiment of a liquid crystal display according to the present invention.

FIG. 1 is a block diagram of an exemplary embodiment of a liquid crystal display according to the present invention, and FIG. 2 is an equivalent circuit diagram of an exemplary embodiment of a liquid crystal display according to the present invention.

As shown in FIG. 1, a liquid crystal display according to an exemplary embodiment of the present invention includes a liquid crystal panel assembly 300, a gate driver 400 and a data driver 500. In an exemplary embodiment, the data driver 500 includes a latch 550 and a signal controller 600.

The liquid crystal panel assembly 300 has a longer length in a transverse or horizontal direction—than in a vertical direction—, as shown in FIG. 1. The liquid crystal panel assembly 300 includes a plurality of signal lines G1-Gn and D1-Dm, and a plurality of pixels connected thereto and disposed in a substantially matrix pattern on the liquid crystal panel assembly 300. Each pixel includes a red pixel R, a green pixel G and a blue pixel B. In addition, as shown in FIG. 2, the liquid crystal panel assembly 300 includes a lower panel 100 and an upper panel 200 disposed opposite to, e.g., facing, the lower panel 100, and a liquid crystal layer 3 interposed therebetween.

In an exemplary embodiment, the gate driver 400, the data driver 500 and the plurality of signal lines $G_1$-$G_n$ and $D_1$-$D_m$ are disposed on the lower panel 100. More specifically, the lower panel 100 according to an exemplary embodiment includes a plurality of gate lines $G_1$-$G_n$ which transmit gate signals (e.g., scanning signals) and a plurality of data lines $D_1$-$D_m$ which transmit data voltages.

As shown in FIG. 1, the gate driver 400 is disposed on an upper portion (relative to the data driver 500) of the liquid crystal panel assembly 300, and the data driver 500 is disposed on a right portion (relative to the gate driver 400) of the liquid crystal panel assembly 300. The gate lines $G_1$-$G_n$ extend substantially parallel to each other in a column direction and are curved at every pixel, and the data lines $D_1$-$D_m$ extend substantially parallel to each other in a row direction.

Each pixel, e.g., each of the red pixel R, the green pixel G and the blue pixel B, such as a pixel connected with an i-th (where i=1, 2, . . . , n) gate line Gi and a j-th (where j=1, 2, . . . , m) data line Dj, includes a switching element Q connected to an i-th gate line Gi and a j-th data line Dj, as well as a liquid crystal capacitor Clc and a storage capacitor Cst connected thereto.

In an exemplary embodiment, the switching element Q is a three-terminal element, such as a thin film transistor ("TFT"), for example, disposed on the lower panel 100, and (more particularly) includes a control terminal connected to the i-th gate line Gi, an input terminal connected to the j-th data line Dj, and an output terminal connected to the liquid crystal capacitor Clc and the storage capacitor Cst, as shown in FIG. 2.

The liquid crystal capacitor Clc includes two terminals, e.g., a pixel electrode 191 on the lower panel 100 and a common electrode 270 on the upper panel 200, and the liquid crystal layer 3 disposed between the pixel electrode 191 and the common electrode 270 as a dielectric material, as shown in FIG. 2. The pixel electrode 191 is connected to the switching element Q, and the common electrode 270 is disposed on an entire surface of the upper panel 200 and receives a common voltage Vcom. In an alternative exemplary embodiment, the common electrode 270 may be disposed on the lower panel 100, and, in this case, at least one of the pixel electrode 191 and the common electrode 270 are formed in a linear, e.g., bar, shape.

The storage capacitor Cst is an auxiliary capacitor to the liquid crystal capacitor Clc, and includes a separate signal line (not shown) disposed on the lower panel 100 and the pixel electrode 191 overlapping the separate signal line with an insulator interposed therebetween. In an exemplary embodiment, a predetermined voltage, such as the common voltage Vcom, for example, is applied to the separate signal line.

To implement color display, each pixel displays each primary color (e.g., spatial division) or, alternatively, pixels PX alternately display the primary colors over time (e.g., temporal division). As a result, a desired color is recognized by the spatial or temporal sum of the primary colors. FIG. 2, for example, shows an exemplary embodiment in which spatial division, in which each pixel includes a color filter 230 which displays one of the primary colors at a region of the upper panel 200 corresponding to the pixel electrode 191. In an alternative exemplary embodiment, however, the color filter 230 may be disposed above or, alternatively, below the pixel electrode 191 on the lower panel 100.

Referring again to FIG. 1, the red pixel R, the green pixel G and the blue pixel B are arranged in the sequence of the red pixel R, the green pixel G and the blue pixel B in a first pixel row, and are arranged in the sequence of the green pixel G, the blue pixel B, and the red pixel R in a second pixel row. Remaining pixels in the liquid crystal panel assembly 300 are alternately repeated in the pixel sequence of the first pixel row and the second pixel row, as shown in FIG. 1. In an exemplary embodiment, the pixels R, G, and B have a substantially rectangular shape wherein longitudinal edges, e.g., long edges, are substantially parallel to the gate lines $G_1$-$G_n$ and latitudinal edges, e.g., short edges, are substantially parallel to the data lines $D_1$-$D_m$.

In an exemplary embodiment, the pixels of the first pixel row and the pixels of the second pixel row are alternately arranged so that one dot, e.g., a base unit for displaying images, includes the red pixel R of the first pixel row, and the green pixel G and the blue pixel B of the second pixel row, or the red pixel R and the green pixel G of the first pixel row, and the blue pixel B of the second pixel row. The above-mentioned configuration is referred to as a delta type.

The pixels of the first pixel row and the pixels of the second pixel row are alternately arranged such that the gate lines $G_1$-$G_n$ are curved for every pixel and extend in the column direction.

In an exemplary embodiment, the liquid crystal panel assembly 300 includes at least one polarizer (not shown).

Referring again to FIG. 1, a gray voltage generator 800 generates a plurality of gray voltages (and/or reference gray voltages) related to a transmittance of the pixels R, G, and B.

The gate driver 400 is connected to the gate lines $G_1$ to $G_m$ of the liquid crystal panel assembly 300, and applies gate signals, e.g., a gate-on voltage Von and a gate-off voltage Voff, to the gate lines $G_1$ to $G_n$.

The data driver 500 is connected to the data lines $D_1$ to $D_m$ of the liquid crystal panel assembly 300, and selects a gray voltage from the gray voltage generator 800 to apply a selected gray voltage as a data voltage to the data lines $D_1$ to $D_m$. However, when the gray voltage generator 800 does not provide respective voltages for every gray but instead only provides a predetermined number of reference gray voltages, the data driver 500 divides the reference gray voltages to generate gray voltages for an entire gray scale range and selects a data signal from among the entire gray scale range.

In an exemplary embodiment, the data driver 500 is directly mounted as at least one integrated circuit ("IC") chip on the right portion of the liquid crystal panel assembly 300, and the gate driver 400 is directly integrated with the liquid crystal panel assembly 300 along with the plurality of signal lines $G_1$-$G_n$ and $D_1$-$D_m$, and the thin film transistor switching element Q, and is disposed on the upper portion of the liquid crystal panel assembly 300 (best shown in FIG. 1).

Thus, in an exemplary embodiment, the gate driver 400 is directly integrated with the upper portion of the liquid crystal panel assembly 300 and the data driver 500 is directly mounted as at least one IC chip on the right portion of the liquid crystal panel assembly 300. As a result, a length, measured in a longitudinal direction of the liquid crystal panel assembly 300 is substantially reduced and/or effectively minimized. Thus, an area required by the gate driver 400, integrated with the liquid crystal panel assembly 300, is narrower, e.g., is substantially reduced, less than an area of the data driver 500 as the IC chip, such that a width of the peripheral area not occupied by the display on the upper portion of the liquid crystal panel assembly 300 is substantially reduced.

In an exemplary embodiment, a number of required data lines $D_1$-$D_m$ is 1/n based on a resolution (A×B). More specifically, n is 3A/B. For example, for QVGA resolution (320×240), a number of data lines is 960 and a number of gate lines is 240 in a conventional display. In an exemplary embodiment, however, the data driver 500 is mounted on the right portion of the liquid crystal panel assembly 300 and the data lines $D_1$-$D_m$ extend in the row direction and the number of data lines is 240 while the number of gate lines is 960 since the gate driver 400 is integrated with the upper portion of the liquid crystal panel assembly 300 and the gate lines $G_1$-$G_n$, extend in the column direction. Accordingly, the number of data lines $D_1$-$D_m$ is reduced to ¼ and, as a result, a required size of the data driver 500 is substantially reduced, thereby reducing cost and thickness of the liquid crystal display according to an exemplary embodiment of the present invention.

An operation of the liquid crystal display according to an exemplary embodiment will now be described in further detail with reference to FIGS. 1, 3, and 4.

Figure 3:
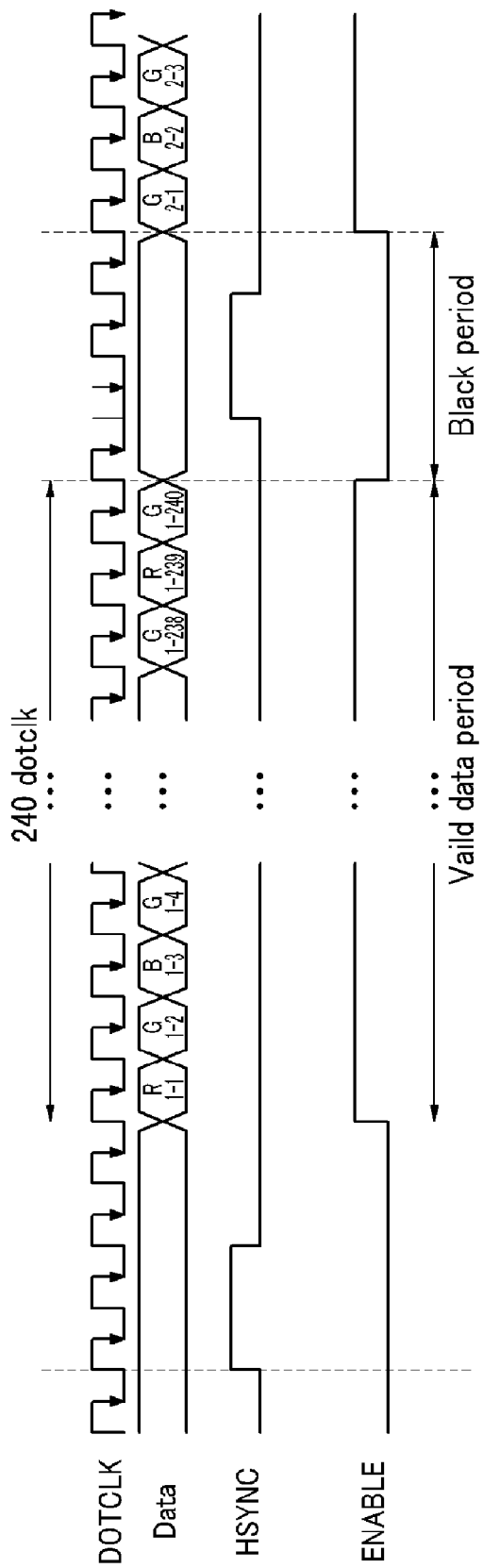
FIGS. 3 and 4 are signal timing diagrams of an exemplary embodiment of a driving signal of a liquid crystal display according to the present invention.
Figure 4:
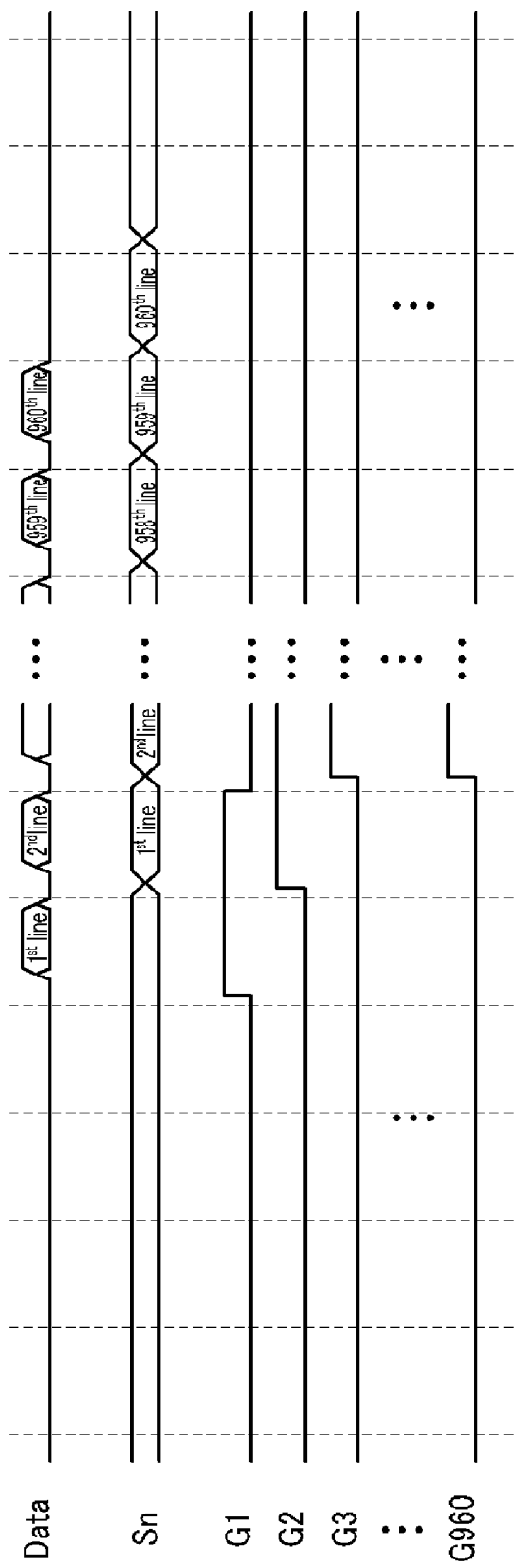

FIGS. 3 and 4 are signal timing diagrams of an exemplary embodiment of a driving signal of a liquid crystal display according to the present invention.

Hereinafter, an exemplary embodiment of the present invention in which a resolution of a liquid crystal display is QVGA (wherein the number of gate lines is 960 and the number of data lines is 240) will be described, but it will be understood that alternative exemplary embodiments are not limited thereto.

Referring again to FIG. 1, the signal controller 600 receives an input image signal Din and an input control signal ICON for controlling display of the input image signal Din from an external graphics controller (not shown). In an exemplary embodiment, the input image signal Din contains luminance information for each pixel, and the luminance has a given quantity of grays, such as 1024 ($=2^{10}$), 256 ($=2^8$) or 64 ($=2^6$), for example. The input control signal ICON includes, for example, a vertical synchronization signal, a horizontal synchronizing signal, a main clock signal and a data enable signal.

The signal controller 600 processes the input image signal Din based on operating conditions of the display panel 300 and further based on the input image signal Din and the input control signal ICON to convert the input image signal Din into an output image signal Dout, and generates a scanning control signal CONT1 and a data control signal CONT2. The signal controller 600 sends the scanning control signal CONT1 to the gate driver 400, and sends the data control signal CONT2 and the processed output image signal Dout to the latch 550.

In an exemplary embodiment of the present invention, the data driver 500 is disposed on the right portion of the liquid crystal panel assembly 300 and the gate driver 400 is disposed on the upper portion of the liquid crystal panel assembly 300 (as described above in greater detail). In an exemplary embodiment, the input image signal Din is changed (as will now be described in further detail) and is thereafter converted into the output image signal Dout.

The red pixel R, the green pixel G and the blue pixel B will hereinafter be referred to according to a number of a corresponding gate line and a number of a corresponding data line. Thus, a position of a given pixel is a coordinate. More specifically, referring to FIG. 1, the pixels of the first pixel row are indicated by R 1-1, G 2-1, B 3-1 . . . , and the pixels of the second pixel row are indicated by G 1-2, B 2-2, R 3-2 . . . .

The input image signals Din are inputted to the gate lines and the data lines, such that the signals for pixels R 1-1, G 1-2, B 1-3 . . . are inputted as first pixel row data, and the signals for pixels G 2-1, B 2-2, R 2-3 . . . are inputted as second pixel row data. When the abovementioned input image signals Din are converted in the liquid crystal display according to an exemplary embodiment of the present invention, they are converted such that R 1-1 becomes R 1-1, G 1-2 becomes G 2-1, B 1-3 becomes B 3-1 . . . , G 2-1 becomes G 1-2, B 2-2 becomes B 2-2, R 2-3 becomes R 3-2 . . . . Thus, when the input image signals Din are converted into the output image signals Dout, a number of gate lines and a number of data lines for each data signal are exchanged as noted above.

The abovementioned conversion algorithm is in the signal controller 600 such that the graphics controller of the apparatus provided with the liquid crystal display according to an exemplary embodiment supplies the input image signals Din as is without conversion of the data.

As shown in FIGS. 3 and 4, the data control signals CONT2 include a horizontal synchronization signal HSYNC for indicating transmission start of the digital image signals Dout for the red pixel R, the blue pixel B and the green pixel G of each column, a load signal LOAD for instructing to apply the analog data voltages to the data lines D1-D240, and a data clock signal DOTCLK. In an exemplary embodiment, the data control signal CONT2 further includes an inversion signal for inverting a polarity of voltages of the data signals (with respect to the common voltage Vcom). Hereinafter "the polarity of the voltages of the data signals with respect to the common voltage" is abbreviated as "the polarity of the data signals".

The gate control signals CONT1 include a scanning start signal for instructing to start scanning and at least one clock signal for controlling an output period of the gate-on voltage Von. The gate control signals CONT1 may further include an output enable signal ENABLE for defining a duration of the gate-on voltage Von.

In response to the data control signals CONT2 from the signal controller 600, the latch 550 receives digital image signals Dout for a row (or, alternatively, a group) of pixels (e.g., the red pixel R, the green pixel G and the blue pixel B) from the signal controller 600, converts the digital image signals Dout into analog data signals by selecting gray voltages corresponding to the respective digital image signals Dout, and applies the digital image signals Dout to the data lines D1 to D240.

The gate driver 400 applies the gate-on voltage Von to the gate lines G1 to G960 in response to the gate control signals CONT1 from the signal controller 600, thereby turning on the respective associated switching elements Q connected thereto. The data voltages applied to the data lines D1 to D240 are supplied to the pixels through the turned-on switching elements Q.

A voltage difference between a voltage of the data signals applied to a given pixel and the common voltage Vcom is a charged voltage of the liquid crystal capacitor Clc, e.g., is a pixel voltage. The liquid crystal molecules of the liquid crystal layer 3 (FIG. 2) are orientated depending on a magnitude of the pixel voltage to change a polarization of light passing through the liquid crystal layer 3. The polarization determines a light transmittance through the polarizer attached to the liquid crystal panel assembly 300 such that the pixels display a luminance represented by the gray levels of the image output signals Dout.

The operation described is repeated each horizontal period 1H (corresponding to one period of the horizontal synchronization signal HSYNC and data enable signal), and the gate-on voltage Von is sequentially applied to all the gate lines G1 to G960, while the data voltage is applied to all the pixels to display an image in one frame.

After the one frame ends, a subsequent frame begins, and a state of the inversion signal applied to the data driver 500 to invert the polarity of the data voltage applied to each pixel PX from the polarity in a previous frame is controlled (referred to as "frame inversion"). In this case, in the one frame, a polarity of the data voltage is periodically changed according to the inversion signal, or, alternatively, the polarities of the data voltage applied to one pixel row may be different.

Figure 5:
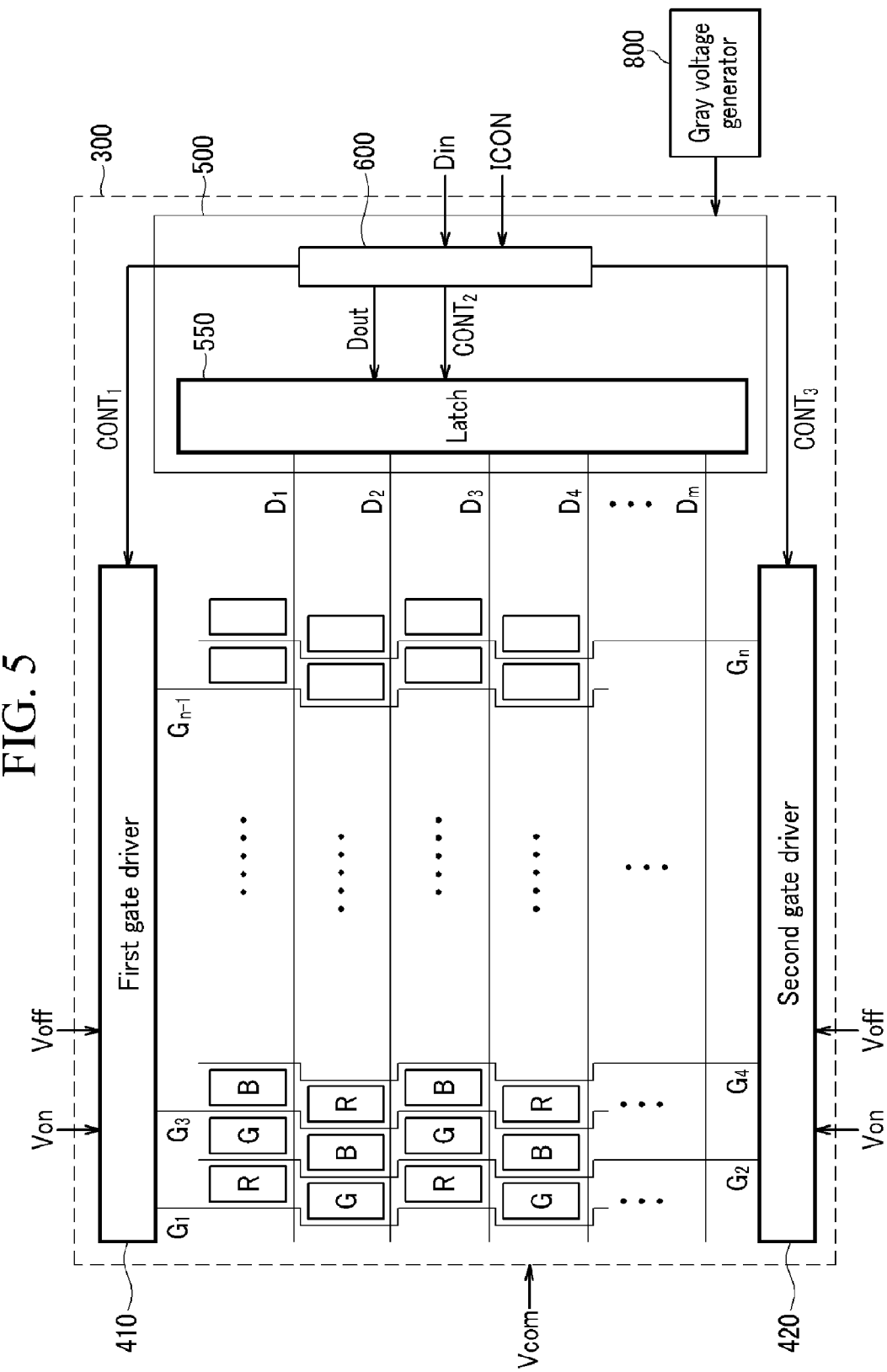
FIG. 5 is a block diagram of an alternative exemplary embodiment of a liquid crystal display according to the present invention.

FIG. 5 is a block diagram of an alternative exemplary embodiment of a liquid crystal display according to the present invention. In FIG. 5, the same or like components as shown in FIG. 1 and described in greater detail above have the same labels, and any repetitive detailed description thereof will hereinafter be omitted.

As shown in FIG. 5, a liquid crystal display according to an alternative exemplary embodiment of the present invention includes a first gate driver 410, driven by a first gate control signal $CONT_1$, disposed on an upper portion of the liquid crystal panel assembly 300 and a second gate driver 420, driven by a second gate control signal CONT$_3$, disposed on the lower portion of the liquid crystal panel assembly 300. In addition, the data driver 500 is mounted as one IC chip type on the right portion of the liquid crystal panel assembly 300, as shown in FIG. 5 and described in greater detail above with reference to FIG. 1.

Data lines D$_1$-D$_m$ substantially extend in a row direction and are substantially parallel to each other. Gate lines G$_1$, G$_3$, G$_5$, . . . , G$_{n-1}$ connected to the first gate driver 410 extend in a column direction toward the second gate driver 420 and are substantially parallel to each other, while gate lines G$_2$, G$_4$, G$_6$, . . . , G$_n$ connected to the second gate driver 420 extend in the column direction toward the first gate driver 410 and are substantially parallel to each other. In addition, the gate lines G$_1$-G$_n$ are curved proximate to each pixel.

When applying QVGA resolution, a number of gate lines is 960, and a number of data lines is 240. As a result a number of gate lines connected to the first gate driver 410 is 480 and a number of gate lines connected to the second gate driver 420 is also 480.

Thus, the first gate driver 410 and the second gate driver 420 are integrated with upper and lower portions of the liquid crystal panel assembly 300, and the data driver 500 is mounted on the right portion of the liquid crystal panel assembly 300 as one IC chip. As a result, a length (measured in a longitudinal direction of the liquid crystal panel assembly 30) is substantially reduced in the liquid crystal panel assembly 300 according to an exemplary embodiment of the present invention.

Thus according to exemplary embodiments of the present invention as described herein, a gate driver is integrated with an upper portion of a liquid crystal panel assembly, and a data driver is mounted directly on a right portion of the liquid crystal panel assembly as one IC chip. As a result, a length of the liquid crystal panel assembly, measured along a longitudinal direction thereof, is substantially reduced and/or effectively minimized.

The present invention should not be construed as being limited to the exemplary embodiments set forth herein. Rather, these exemplary embodiments are provided so that this disclosure will be thorough and complete and will fully convey the concept of the present invention to those skilled in the art. For example, exemplary embodiments of the present invention are described herein with reference to a liquid crystal display, but alternative exemplary embodiments of the present invention are not limited thereto and may instead be applied to various different types of display devices having thin film transistors, for example.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
  a liquid crystal panel assembly comprising:
    pixels;
    gate lines;
    data lines; and
    a first gate driver; and
  a driving chip disposed on the liquid crystal panel assembly, wherein
  a shape of the liquid crystal panel assembly is rectangular and the liquid crystal panel assembly includes a first long edge and a short edge adjacent to and substantially perpendicular to the first long edge,
  the data lines extend in a first direction substantially parallel to the first long edge,
  the gate lines extend in a second direction substantially parallel to the short edge,
  the pixels are disposed in pixel rows and are connected to the gate lines and the data lines,
  the first gate driver is disposed on a peripheral area of the first long edge, and
  the driving chip is connected to the data lines,
  wherein the gate lines comprise curves proximate to the pixels.

2. The liquid crystal display of claim 1, wherein
a shape of the pixels is substantially rectangular and each of the pixels includes a long edge and a short edge,
the long edge of the pixels is substantially parallel to the gate lines, and
the short edge of the pixels is substantially parallel to the data lines.

3. The liquid crystal display of claim 2, wherein
the first gate driver is integrated into the liquid crystal panel assembly.

4. The liquid crystal display of claim 3, wherein
the pixel rows include:
a first pixel row in which respective pixels therein are arranged in a first sequence comprising a red pixel, a green pixel and a blue pixel;
a second pixel row in which respective pixels therein are arranged in a second sequence comprising a green pixel, a blue pixel and a red pixel, and
the first sequence of the first pixel row and the second sequence of the second pixel row are alternately repeated in subsequent pixel rows of the pixel rows.

5. The liquid crystal display of claim 4, wherein
the gate lines are disposed between adjacent pixels.

6. The liquid crystal display of claim 5, wherein:
the gate lines comprise a first gate line, a second gate line and a third gate line;
the first gate line is connected to the red pixel of the first pixel row and the green pixel of the second pixel row;
the second gate line is connected to the green pixel of the first pixel row and the blue pixel of the second pixel row; and
the third gate line is connected to the blue pixel of the first pixel row and the red pixel of the second pixel row.

7. The liquid crystal display of claim 6, wherein:
the driving chip comprises a signal controller and a latch;
the signal controller converts an input image signal into an output image signal and generates a gate control signal and a data control signal; and
the latch supplies the output image signal and the data control signal to the data lines.

8. The liquid crystal display of claim 7, wherein
the signal controller converts the input image signal into the output image signal by exchanging a number corresponding to a given gate line with a number corresponding to a given data line based on a position coordinate of data represented by the number corresponding to the given gate line and the number corresponding to the given data line.

9. The liquid crystal display of claim 1, wherein the liquid crystal panel assembly further comprises:
a second long edge opposite to and substantially parallel to the first long edge; and
a second gate driver disposed proximate to the second long edge.

10. The liquid crystal display of claim 9, wherein
the second gate driver is integrated into the liquid crystal panel assembly.

11. The liquid crystal display of claim 10, wherein
the pixel rows include:
a first pixel row in which respective pixels therein are arranged in a first sequence comprising a red pixel, a green pixel and a blue pixel; and
a second pixel row in which respective pixels therein are arranged in a second sequence comprising a green pixel, a blue pixel and a red pixel,
wherein the first sequence of the first pixel row and the second sequence of the second pixel row are alternately repeated in subsequent pixel rows of the pixel rows.

12. The liquid crystal display of claim 11, wherein
the gate lines are disposed between adjacent pixels.

13. The liquid crystal display of claim 12, wherein:
odd-numbered gate lines of the gate lines are connected to the first gate driver; and
even-numbered gate lines of the gate lines are connected to the second gate driver.

14. The liquid crystal display of claim 13, wherein:
the gate lines comprise a first gate line, a second gate line and a third gate line;
the first gate line is connected to the red pixel of the first pixel row and the green pixel of the second pixel row;
the second gate line is connected to the green pixel of the first pixel row and the blue pixel of the second pixel row; and
the third gate line is connected to the blue pixel of the first pixel row and the red pixel of the second pixel row.

15. The liquid crystal display of claim 14, wherein:
the driving chip comprises a signal controller and a latch;
the signal controller converts an input image signal into an output image signal and generates a gate control signal and a data control signal; and
the latch supplies the output image signal and the data control signal to the data line.

16. The liquid crystal display of claim 15, wherein
the signal controller converts the input image signal into the output image signal by exchanging a number corresponding to a given gate line and a number corresponding to a given data line based on a position coordinate of data represented by the number corresponding to the given gate line and the number corresponding to the given data line.

17. The liquid crystal display of claim 9, wherein
a shape of the pixels is rectangular and each of the pixels includes a long edge and a short edge,
the long edge of the pixels are substantially parallel to the gate lines, and
the short edges of the pixels are substantially parallel to the data lines.

18. The liquid crystal display of claim 1, wherein
when a resolution of a display area of the liquid crystal panel assembly is A×B, a number of data lines extending in the first direction is less than a number of gate lines extending in the second direction by a factor of B/3A.

* * * * *